No. 782,730. PATENTED FEB. 14, 1905.
J. J. DUNWOODY.
VALVE.
APPLICATION FILED APR. 9, 1904.
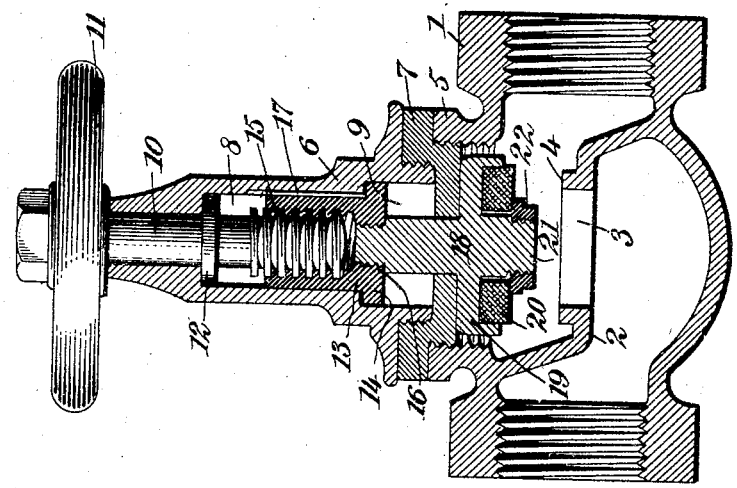
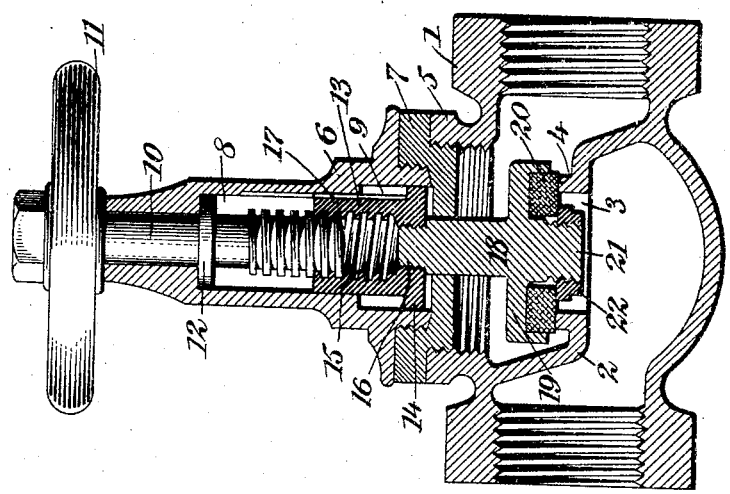
WITNESSES:
INVENTOR
John J. Dunwoody
BY
ATTORNEYS No. 782,730.

Patented February 14, 1905.

UNITED STATES PATENT OFFICE.

JOHN J. DUNWOODY, OF NEW YORK, N. Y.

VALVE.

SPECIFICATION forming part of Letters Patent No. 782,730, dated February 14, 1905.

Application filed April 9, 1904. Serial No. 202,303.

*To all whom it may concern:*

Be it known that I, JOHN J. DUNWOODY, a citizen of the United States, and a resident of the city of New York, borough of Manhattan, in the county and State of New York, have invented a new and Improved Valve, of which the following is a full, clear, and exact description.

This invention relates to valves, and more especially to valves designed, primarily, for use on steam-pipes, but adapted for use in conduits for any fluid which does not have corrosive action upon the cylinders of the valve.

The object of the invention is to provide a valve of the character specified which is so constructed that the gland or stuffing-box ordinarily employed around the valve-stem to prevent the escape of steam or other fluid between the valve-stem and the casing may be dispensed with without allowing any escape of steam around the stem.

With the object above stated and others of minor character in view, as will hereinafter appear, the invention consists in the construction, combination, and arrangement of parts of a valve, as hereinafter described in a preferred form of embodiment and having the novel features thereof specifically pointed out in the appended claims, it being understood that changes in the form, proportions, and exact mode of assemblage of the elements of the structure may be made without departing from the spirit of the invention or sacrificing its advantages.

Reference is to be had to the accompanying drawings, forming a part of this specification, in which similar characters of reference indicate corresponding parts in both views.

Figure 1 is a sectional view through a valve constructed in accord with the present invention, showing the valve seated to prevent the passage of fluid through the valve; and Fig. 2 is a sectional view through the valve, showing the valve unseated to permit the passage of fluid through the valve.

Referring to the drawings, 1 designates a T, having a partition 2 therein which extends in a generally oblique direction across the channel through the T and presents a bore 3 opposite the side branch of the T. The bore 3 is surrounded by a rim 4, which forms a valve-seat, as will hereinafter appear, and the axis of the bore coincides with the axis of the side branch 5 of the T. The valve-casing 6 is connected with the side branch 5 of the T by a cup-shaped union 7, which is internally threaded to receive the valve-casing and is externally threaded to engage an internal thread formed within the branch 5. The valve-casing is formed with two communicating chambers 8 and 9, the latter being the larger and being nearer the base of the casing. These chambers are preferably formed about the same axis, and when the casing is in position the axis thereof coincides with the axis of the bore 3 in the partition 2. In the top of the valve-casing a valve-stem 10 is rotatably mounted, which is provided with a hand-wheel 11 or the like to facilitate the turning thereof. In the top of the chamber 8 of the valve-casing a flange 12 upon the valve-stem fits loosely against the top of the chamber and against the inner surface of its wall. The lower portion of the stem is threaded to engage with a threaded socket 15 in a block 13, which is slidably mounted within the valve-casing and has at its lower end a flange 14, which fits within the larger chamber 9 of the casing, while the upper portion of the block fits smoothly within the chamber 8 of the casing. At its lower end the block 13 is provided with a threaded socket 16 for the reception of a threaded stud upon the upper surface of the valve, and the block is held against rotative movement within the chambers of the valve-casing by means of a feather 17, formed at one side of the chamber 8 and engaging with a corresponding groove in the block 13.

The valve proper consists of a member 18, provided on its upper surface with an externally-threaded stud which engages with the threaded socket 16 in the lower end of the block 13. The member 18 has a flange 19 recessed on its under surface to receive an annular packing-washer 20, of any suitable material, which surrounds a downwardly-disposed stud 21 upon the under surface of the valve member and is secured in position by means of a nut 22 upon the said stud.

The operation of the valve above described will be readily understood from an inspection of the drawings, in which the members of the valve structure are shown in open and closed position. Assuming that the valve is closed, as shown in Fig. 1, the rotation of the hand-wheel 11 in clockwise direction will cause the block 13 to be drawn upward in the chambers 8 and 9 of the valve-casing, and the valve member 18 will be raised therewith. When the valve is open, as shown in Fig. 2, the reverse rotation of the hand-wheel 11 will cause the block 13 to descend in the casing, and the packing-washer carried by the valve member will contact with the rim 4, which forms the valve-seat surrounding the bore 3. The arrangement of the block 13 within the chambers 8 and 9 of the valve-casing makes the provision of a stuffing-box or gland about the valve-stem unnecessary to prevent the escape of steam between the valve-stem and the valve-casing. As will be seen from an inspection of the drawings, the steam or other fluid in escaping at the top of the valve-casing must first pass between the upper surface of the flange 19 of the valve member 18 and the base of the cup-shaped union 7 and then between the stud upon the top of the valve member 18 and the wall of the opening in the union 7, through which the stud extends upward. After passing above the union 7 the steam must pass between the member 13 and the wall of the chamber 9. Then its upward passage must be continued between the reduced portion of the member 13 and the wall of the chamber 8 until it finally reaches the open space in the top of the chamber 8 and can pass easily outward through the bore at the top of the valve-casing. Thus it will be seen that the course which must be pursued by the steam in effecting its escape at the top of the valve-casing is extremely tortuous, and with the valve member 18 and sliding member 13 fitted accurately in the guides within which they move the opportunity afforded for the escape of steam is extremely limited, and with even a very slight lubrication of the parts the escape of steam will be completely prevented. When the valve is open to its full extent, as shown in Fig. 2, the top of the flange 19 of the valve member 18 contacts with the under surface of the cup-shaped connection 7, and the upper surface of the enlargement at the bottom of the member 13 contacts with the top of the chamber 9 in the valve-casing, so increasing greatly the difficulty with which steam escapes through the valve-casing.

When the valve is not open to its full extent, the flange of the member 18 does not contact with the union 7 at the bottom nor does the member 13 jam against the top of the chamber 9; but the close fit of the stud on the top of the member 18 within the opening in the connection 7 and the close fit of the member 13 within the chambers 8 and 9 make the passage of steam up into the top of the valve-casing practically impossible.

While I have described the parts of the valve as arranged in the position shown in the drawings, with the stem 10 standing vertically and having the hand-wheel 11 at the top thereof, it is obvious that the position of the valve may be varied, and reference to the upper and lower parts of the structure are made simply for convenience, and I wish it to be understood that the valve is intended to be arranged in any position that may be found expedient.

Having thus described my invention, I claim as new and desire to secure by Letters Patent—

1. In a structure of the character specified, the combination with a valve-casing having a large chamber at the lower end and a smaller chamber above the large chamber and coaxial therewith, of a block having portions corresponding to the cross-sectional areas of said chambers and arranged for sliding movement in said casing, mechanism in the upper part of said casing for imparting sliding movement to said block, a chambered member having a valve-seat coaxial with said casing, a union disposed between said valve-seat and said chambered member and presenting a wall separating the chambered member from the valve-casing, said wall having a central opening therein, and a valve member disposed beneath the said union and having a stem projecting through the opening in the union and engaging said block.

2. In a structure of the character specified, the combination of a valve-casing having a plurality of communicating chambers of different diameters, a block fitted within said chambers for slidable movement therein, a valve member carried by said block, and means for imparting movement to the block.

In testimony whereof I have signed my name to this specification in the presence of two subscribing witnesses.

JOHN J. DUNWOODY.

Witnesses:
   EDWARD LARKIN,
   MICHAEL DAVIS.